United States Patent
Nisnevich

(10) Patent No.: US 6,805,504 B1
(45) Date of Patent: Oct. 19, 2004

(54) METHOD AND APPARATUS FOR FLAT SURFACE TREATMENT

(75) Inventor: Lev Nisnevich, Tel Aviv (IL)

(73) Assignee: Kandelshein Ltd., Ra'anana (IL)

( * ) Notice: Subject to any disclaimer, the term of this patent is extended or adjusted under 35 U.S.C. 154(b) by 63 days.

(21) Appl. No.: 10/068,587

(22) Filed: Feb. 6, 2002

(30) Foreign Application Priority Data

Feb. 2, 2003 (IL) ........................................ 2001-141300

(51) Int. Cl.[7] ............................................. B62D 57/02
(52) U.S. Cl. ................... 400/283; 400/70; 400/691; 400/693; 118/305; 180/8.1; 180/8.5; 180/8.6; 101/35; 101/45
(58) Field of Search .................. 101/35, 45; 180/8.1, 180/8.5, 8.6; 400/283, 76, 61, 70, 691, 693; 118/305, 323

(56) References Cited

U.S. PATENT DOCUMENTS

| | | | |
|---|---|---|---|
| 4,462,476 A | * 7/1984 | Shkolnik | ..................... 180/8.6 |
| 4,662,465 A | 5/1987 | Stewart | |
| 4,683,836 A | * 8/1987 | West | ......................... 118/305 |
| 4,790,400 A | 12/1988 | Sheeter | |
| 4,940,382 A | 7/1990 | Castelain et al. | |
| 5,094,311 A | 3/1992 | Akeel | |
| 5,780,957 A | 7/1998 | Oliver et al. | |
| 5,848,849 A | 12/1998 | Kishi et al. | |
| 5,959,424 A | 9/1999 | Elkmann et al. | |
| 6,040,643 A | 3/2000 | Bruns | |
| 6,040,653 A | 3/2000 | O'Neill | |
| 6,068,073 A | * 5/2000 | Roston et al. | ............... 180/8.5 |
| 6,116,707 A | 9/2000 | Avida | |
| 6,177,770 B1 | 1/2001 | Feygin | |
| 6,467,978 B1 | * 10/2002 | Tideman, Jr. | ................ 400/76 |
| 2002/0159808 A1 | * 10/2002 | Smith | ......................... 400/283 |

FOREIGN PATENT DOCUMENTS

| | | |
|---|---|---|
| JP | H03-26572 | 2/1991 |
| JP | H05-169731 | 7/1993 |
| JP | H06-127191 | 5/1994 |
| JP | H07-266625 | 10/1995 |
| JP | H10-181109 | 7/1998 |

* cited by examiner

*Primary Examiner*—Andrew H. Hirshfeld
*Assistant Examiner*—Kevin D. Williams
(74) *Attorney, Agent, or Firm*—Robert L. Stone

(57) ABSTRACT

Apparatus for printing, scanning engraving or cutting a flat horizontal surface, particularly when the surface is of non-standard dimensions or is supplied in an non-standard manner. The apparatus is suitable for following outside electro-mechanically commanded instruction and contains an instrument for printing, scanning, engraving or cutting in a stepwise manner by being accurately raised and lowered to the surface and a component for treating the surface.

10 Claims, 5 Drawing Sheets

Isometric view for general description

Figure 1 – Isometric view for general description
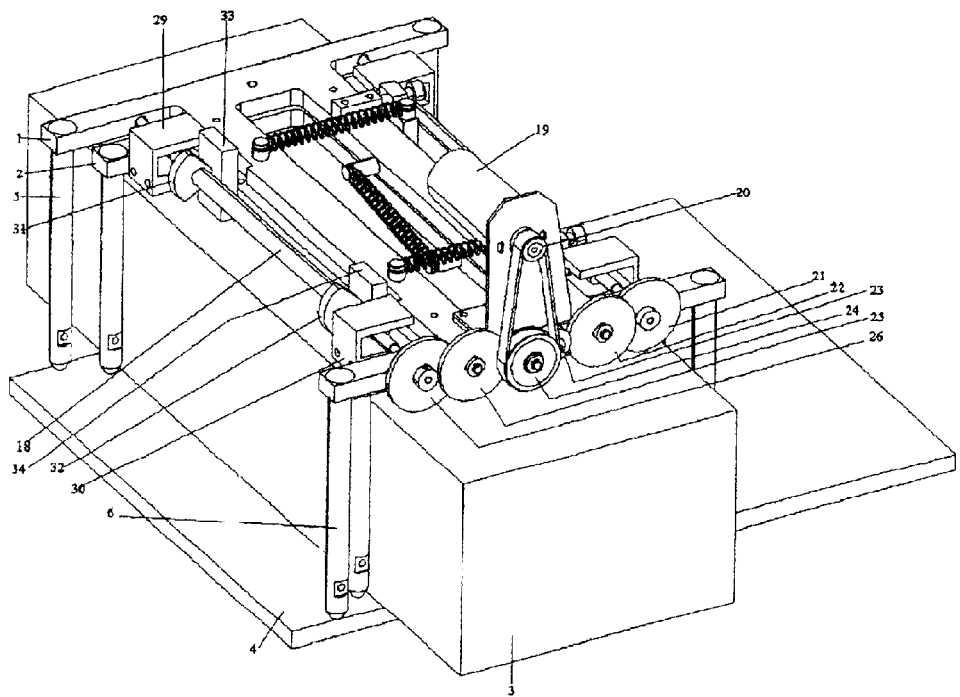
Figure 2 – Isometric view for general description
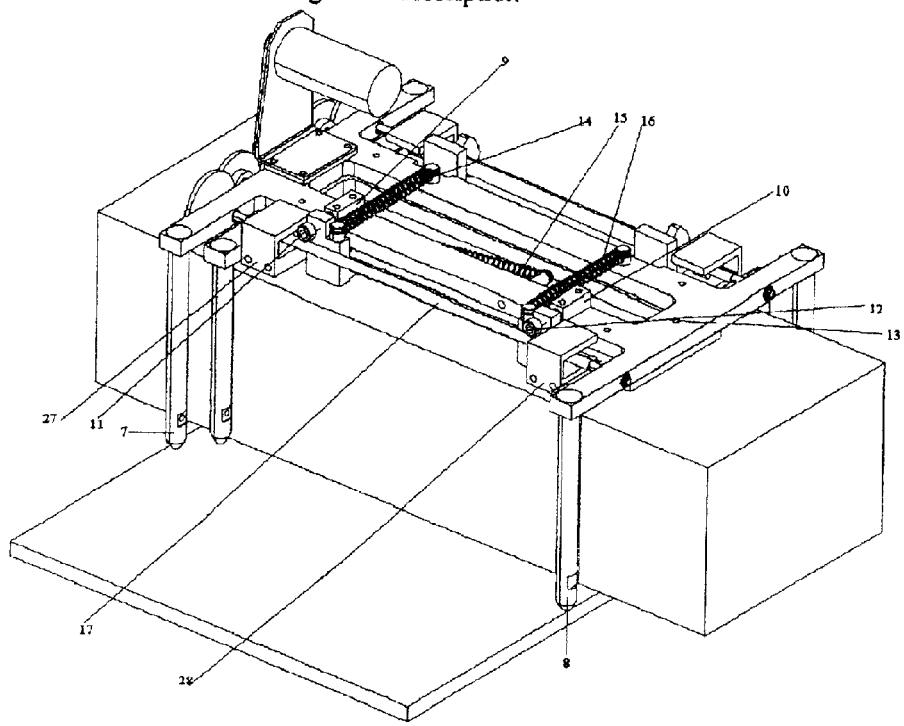

Figure 3 – Printing position – both Units 1,2 are stationary on the surface.
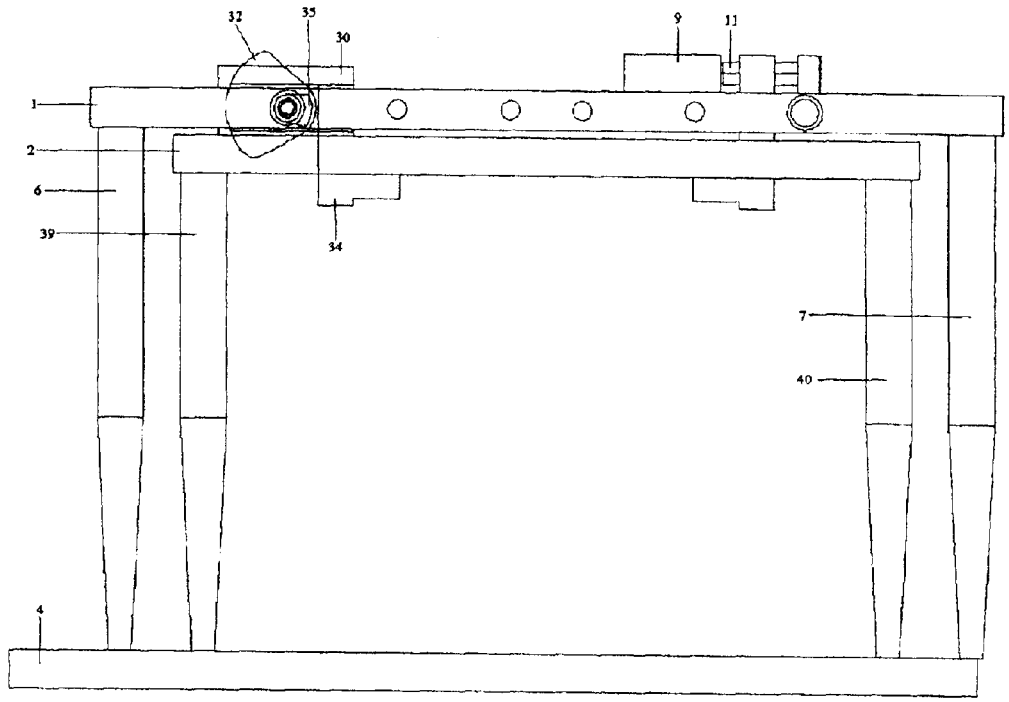
Figure 4 - First step- Unit 1 on the surface. Unit 2 starts moving above the surface.
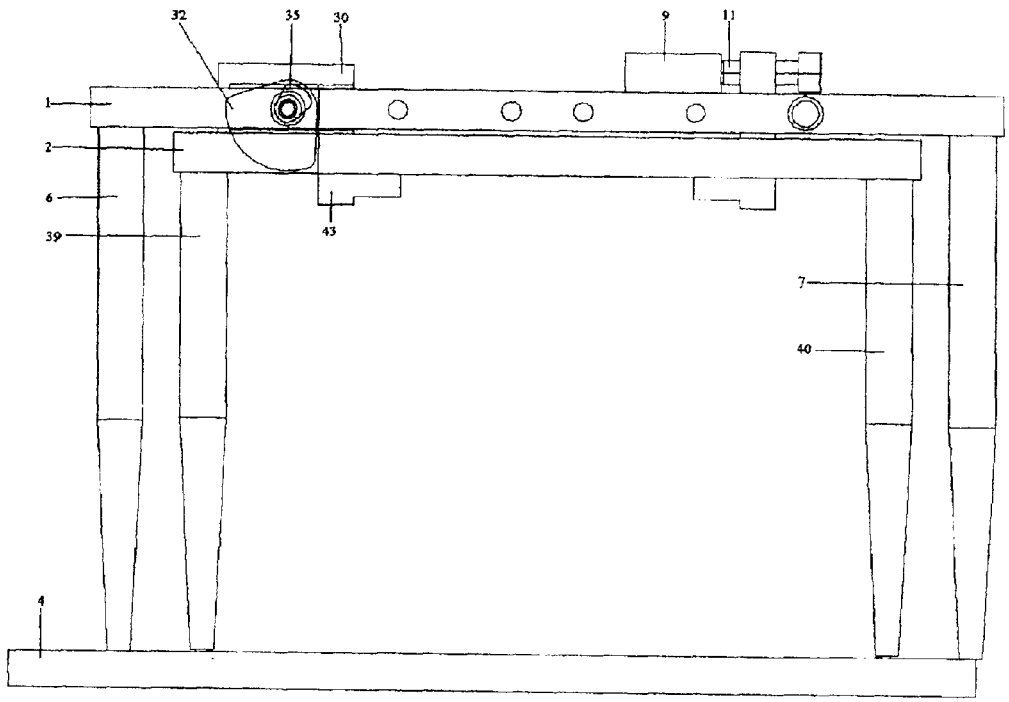

Figure 5 - Second step - Unit 2 moves full step forward.
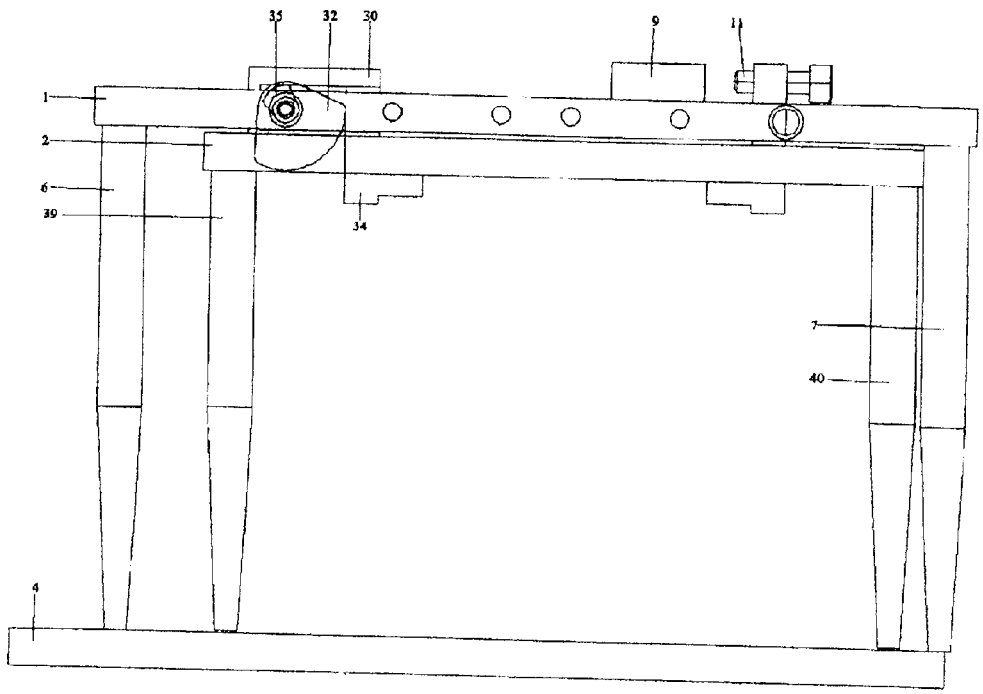
Figure 6 - Third Step - both Units 1,2 on the surface.
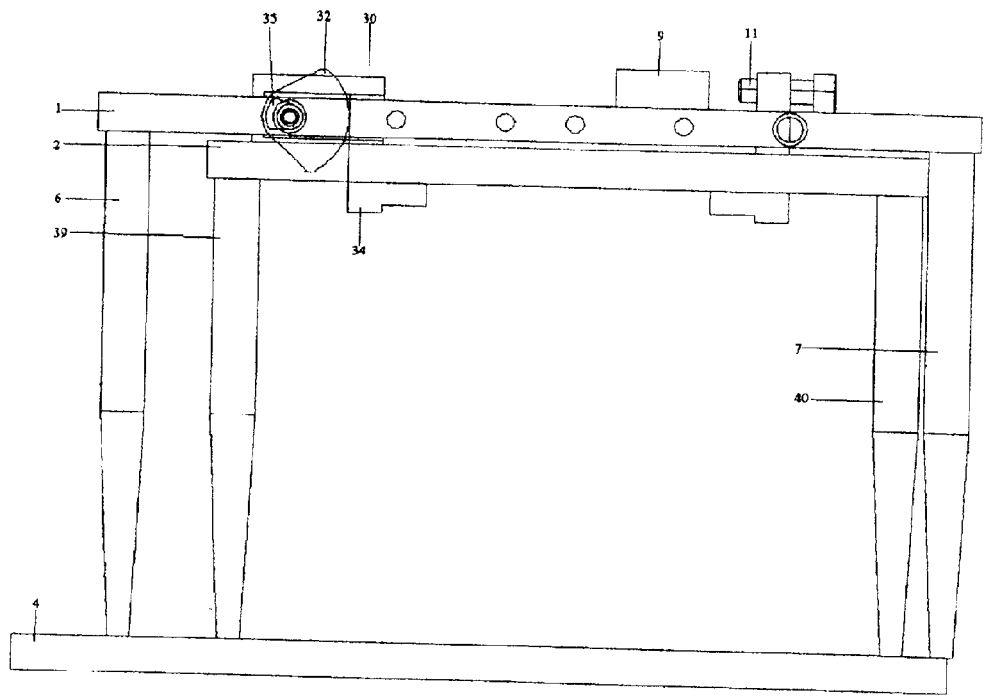

Figure 7 - Forth step - Unit 1 start moving above Unit 2 & start moving full step forward.
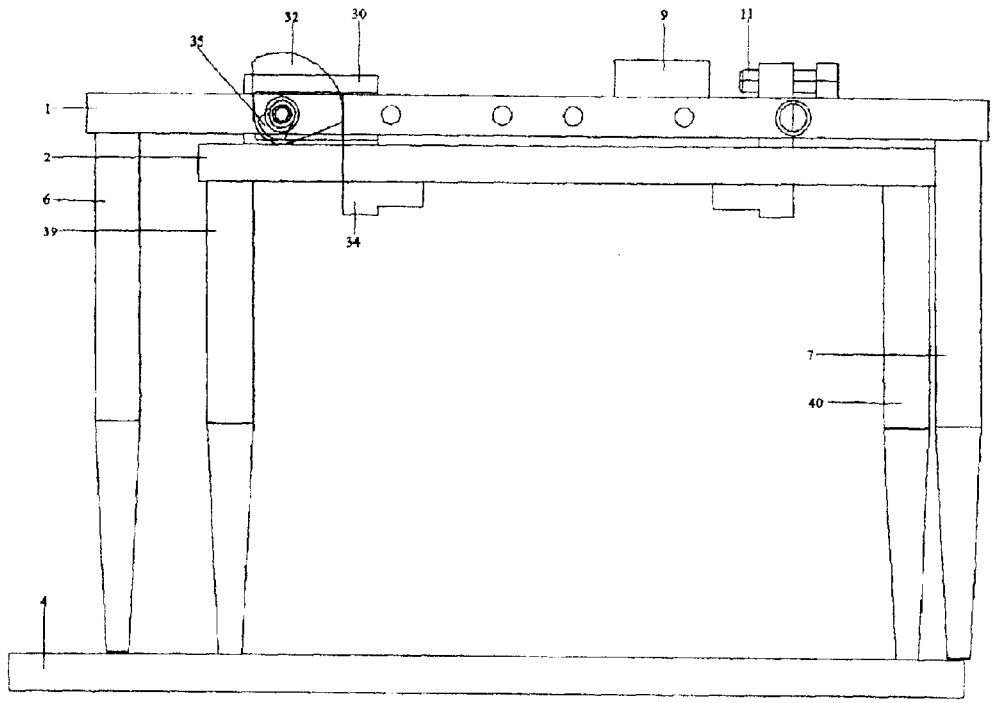
Figure 8 - Step five - Unit 1 at full step forward & start moving down to the table.
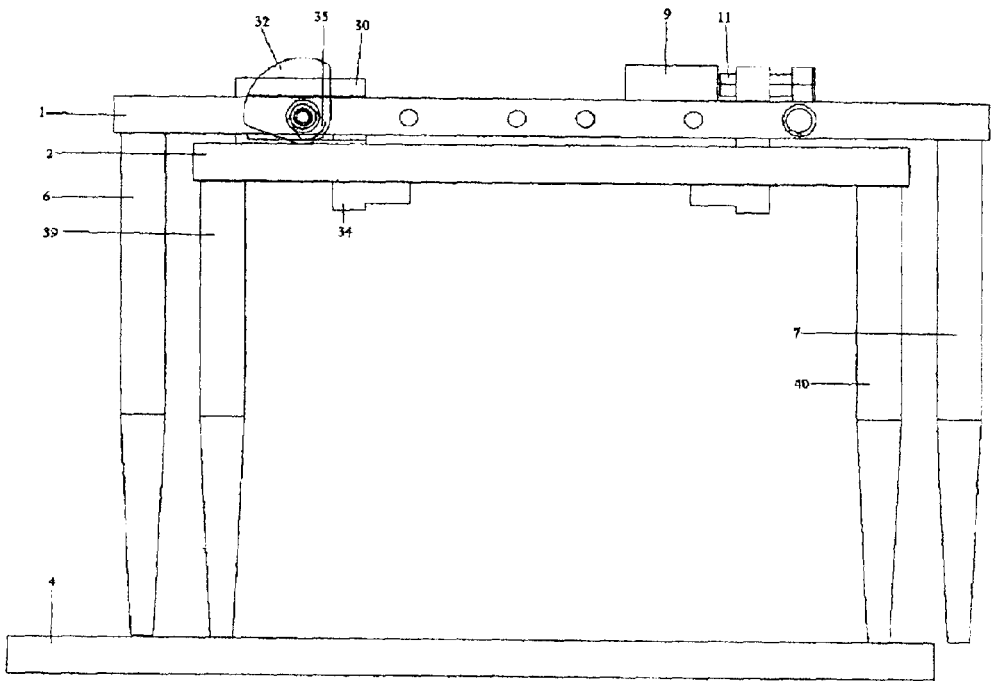

Figure 9 - Vertical motion axle.
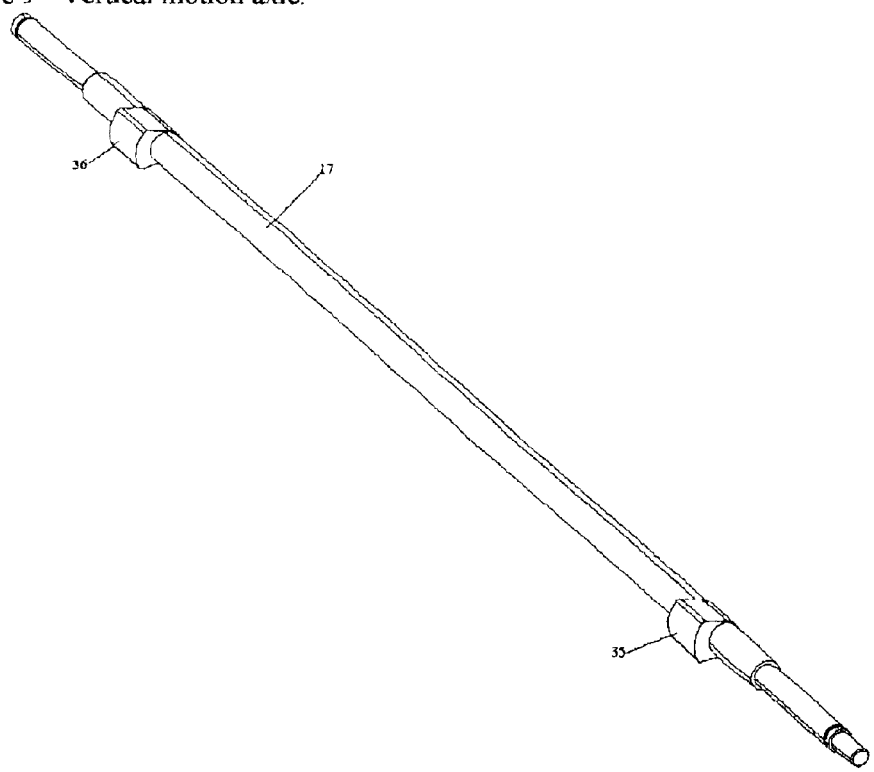
Figure 10 - Vertical and horizontal motion axle.
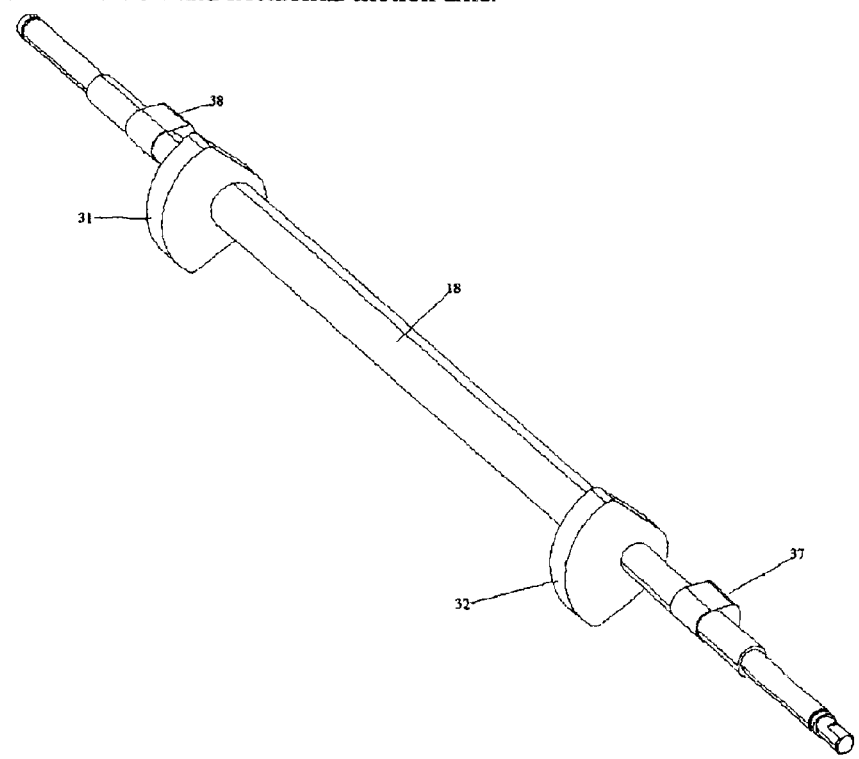

METHOD AND APPARATUS FOR FLAT SURFACE TREATMENT

1. BACKGROUND OF THE INVENTION

Commercial printers and plotters, as on-the-shelf products, exist in the home and office markets, and are designed to print on paper and transparencies. These products are equipped with popular printing heads, like ink-jets and laser.

Office printers are relatively inexpensive and are dedicated for fast quality printing on sheets of fixed width.

Advertising agencies, graphic designers, artists and engineering offices have, at most, one plotter in their office designated for paper only, and the cost of the equipment is determined by the maximum width of the plotter, and for the bigger dimensions are expensive.

Printing on special material, such as non-standard paper that is thicker than usual, not in standard rolls, carton, or glass, forces the use of dedicated service bureaus, which have such machines for special printing. Machines intended for such purposes are very expensive and not with in reach of smaller offices, and turning to external service bureaus is also expensive and causes delays, as the cycle is longer.

Printing on special materials forces an examination of the outcome of the printing job, as the colors and quality of the print are unpredictable, and usually require at least one reprinting.

Present invention intends to provide a better solution to all the problems describe above.

2. SUMMARY OF THE INVENTION

This invention refers to an apparatus comprising a support assembly capable of moving in accurate steps on flat horizontal surfaces, like a table, and which carries with it a surface treating instrument or mechanism such as printer, scanner, cutter, engraver, etc, which treats the surface as desired.

The movement of the support assembly is based on performing accurate steps. The accuracy of the system derives from the accuracy of the intermediate stages of each step, and from the fact that the support assembly actually is continuously in positive contact with the surface. This provides the required basis for accurate surface treating tools.

The support assembly, equipped as mentioned above, will be used for applying various treatments of flat surfaces, such as printing, to desired surfaces such as a large sheet of paper or other flat materials. The term "treatment" used herein signifies at least one of the following scanning, printing, patterning (e.g. engraving) and cutting. The surface to be treated may be paper, metal, linen, or any other flat material.

The advantage of this invention is that the support assembly can move above the treated material in unbound motion, instead of the material having to pass through it, which is common feature of present other machines. In the other machines the size, thickness and sometimes the flexibility limit the material. This machine is able also to treat all rigid materials, of any size and of any thickness, in any direction and any length. Such needs are encountered in the printing industry, for example.

The material that is, as an example, to be printed, is to be laid on the table or flat surface, with the support assembly, holding a printing tool, positioned over it. The support assembly receives step command from a control system, performs it, becomes stationary for a specified period in which the tool prints on a section of the material, and then the support assembly moves another step, and so on.

The support assembly is an integration of two sub-units, whose relative positions are fixed—in the stationary position, and floating—when in the state of movement. A single step of the support assembly is a combination of the full step of each unit relative to the other. A full step of the support assembly is composed of the following sequence: both units are stationary on the surface, one unit rises over the other, takes a full step forward, and then lowers itself back to the surface. After this, the second unit rises over the first, takes the same full step forward, and lowers itself back to the surface, where the support assembly is again in the stationary position. The (single line) printing action is then performed, after both units of the support assembly have finished their movements.

3. BRIEF DESCRIPTION OF THE DRAWINGS

FIG. 1—Isometric view for general description, top-rear-left view.

FIG. 2—Isometric view for general description, top-front-right view.

FIGS. 3 to 8 are the same side view and explain a full support assembly step cycle.

FIG. 3—Printing position—both units 1,2 are stationary on the surface.

FIG. 4—First step—Unit 1 on the surface. Unit 2 Start moving above the surface.

FIG. 5—Second step—Unit 2 moves full step forward.

FIG. 6—Third Step—both units 1,2 on the surface.

FIG. 7—Forth step—Unit 1 start moving above Unit 2 & start moving full step forward.

FIG. 8—Step five—Unit 1 at full step forward & start moving down to the table.

FIG. 9—Vertical motion axle.

FIG. 10—Vertical and horizontal motion axle.

4. DETAILED DESCRIPTION OF REFERRED EMBODIMENT

Construction of the Machine and the Support Assembly

FIG. 1 and FIG. 2 show a machine, built of the following: A Support assembly composed mainly of Units 1 and 2, Box 3, containing elements of a printing tool. Unit 1 has an electromechanical motion mechanism, also shown. The machine is positioned over Surface 4, on which the material to be printed on is laid.

Each of Units 1 and 2, both shaped like a horizontal "H", has four vertical legs in the corners, all of the same height for each Unit. The legs of Unit 1 are 5,6,7,8.

Units 1,2 have a certain freedom to move in relation to each other, in the horizontal and vertical directions. A complete step cycle is a combination of vertical and horizontal movements between them, created by the electromechanical mechanism, beginning and ending in the stationary state defined by the reference contact points.

Horizontally the Units have three contact points between them. Blocks 9,10 which are part of Unit 1 establish the longitudinal reference. These serve for contact points against Screws 11,12 which belong to Unit 2. The lateral reference point is established by a short pin inserted in Hole 13 of Unit 1 and points down, against which an edge of Unit 2 contacts at all times. Springs 14,16, are attached in tension between Units 1 and 2, and act to keep the Units as close as possible longitudinally, and Spring 15, also attached between the two units in tension, acts to maintain the contact in the lateral direction The above mentioned horizontal and vertical movements are created by Cams belonging to the two Axles 17,18, rotated by the Motor 19 and Transmission gears 20,21,22, 23,24,25,26 comprising together the said electromechanical mechanism. The transmission synchronizes the two Axles as to the starting position angle, direction of rotation and angle rotated.

Axle 17, shown in detail in FIG. 9, includes two cams of the excenter type that serve to create the relative vertical movement between Units 1 and 2. Axle 18, shown in FIG. 10, includes two identical cams like Axle 17 and two larger, also excenter-type, cams. The smaller cams here also serve for the vertical motion of the units, as the cams of Axle 17 do, and its larger cams serve for creating the longitudinal motion of the support assembly.

Axle 17 ends are installed in holes in Unit 1 and, when rotated by the transmission, its cams make timed-contacts with U profiles 27,28, which are solidly mounted onto Unit 2.

Similarly, Axle 18 is installed in Unit 1. Its smaller cams operate against U-profiles 29,30 of Unit 2, and its larger cams operate against Blocks 33,34 mounted onto Unit 2 also.

The Kinematics of the Support Assembly Operation

The support assembly forward motion is a repetitive succession of single steps, each created by a combination of vertical and horizontal relative motions between Units 1,2 and stationary-state periods between them.

The vertical relative motion is created as follows:

The support assembly, as described above, has four identical cams in its corners: Items 35,36 in FIG. 9 and Items 31,32 of FIG. 10, all attached to Unit 1, that rotate in synchronization and make timed contacts with Unit 2 by its U-profiles 27,28,29,30. These create the relative vertical motions between Unit 1 and Unit 2 during a single revolution of the axles.

The parts are so designed that each Cam 31,32,35,36, when passing its top position, presses against the U profile upper-inner surface and, as then Unit 1 has its legs on the Surface 4, it is able to lift it a little, thus Unit 2 lifts above Unit 1 for a short time, after which it comes down again. As the cam continues its rotation, when it passes through its straight-down point, it presses against same U's lower-inner surface. But now Unit 2, which the U-profile is part of, has its legs back on the Surface, so essentially Unit 1, by the action of its cam, lifts itself a little relative to Unit 2, and thus also above the Surface 4.

When no contact is made between the cam and the U-profile, all two Units legs are on the Surface and there is no relative vertical motion then. This occurs twice per revolution.

The horizontal relative motion is created as follows:

Axle 18, mounted onto Unit 1, has its two Cams 31,32 operating against Blocks 32,33 which are solidly mounted onto Unit 2. In the stationary state the round sectors of the Cams do not contact the Blocks and the distance between the Units is determined by the abovementioned system of contact points and springs. As the axle rotates, the Cam round sectors come into contact with the Blocks 33,34 and outdistance the Units one from the other, and return to the stationary state, completing a full revolution. When the sector where the radius is maximal and constant contacts and slides on the surface of the Block opposite it, the longitudinal distance between the Units is maximal and constant.

A full step is taking place when the wide side of excentric 31,32 touches the surface of elements 33,34.

FIG. 1 and FIG. 2 are at the stationary stat.

The following description provides explanation of the combination of the above-described vertical and horizontal movements that together create the support assembly step. Reference is made to FIGS. 3,4,5,6,7,8. These figures are side views of the support assembly. Taking FIG. 3 as typical, it shows on left upper corner a detail of the Axle 18 with its smaller Cam 35 opposite the U-profile 30 (both upper-lower and lower-upper surfaces shown), and larger Cam 32 opposite Blocks 34. The gear transmission is here omitted for clarity. Like wise Axle 17 is omitted. On the upper right hand corner there is shown the detail of a reference point, where Screw 117 belonging to Unit 2, is positioned against Block 9 belonging to Unit 1. The Figure also shows two of the four legs that each unit has and the Surface 4.

FIGS. 3 to 8 show how a step is created by a full revolution of Axle 18 and its Cams anticlockwise. Axle 17, with its two Cams and the U-profile positioned opposite them, revolve in synchronization in the opposite direction and perform same actions.

A full step of the support assembly is composed of the following sequence, as a result of continuous revolving of Axle 18: A full step of the support assembly is equivalent to full round of the two axles.

1. FIG. 3 shows the stationary state where: Cam 35 is in no contact with the U-profile 30 therefore both Units 1,2 Legs are on the Surface, due to their weight and the tool's weight; Cam 32 is in no contact with Block 34, therefore there is positive contact in the reference point, caused by the horizontal Springs 14,16 seen in FIG. 2.
2. Cam 35 comes to contact with the surface of the U-profile above it and Unit 2 starts rising relative to Unit 1; Legs 39,40 leave the surface 4, as shown in FIG. 4.
3. Cam 32 makes contact with Block 34 and pushes it to the right, thus Unit 2, now in its raised level, outdistances from Unit 1 the distance dictated by the cam's round sector, actually the step size; between Block 9 and Screw 11 a gap is opened, as shown in FIG. 5.
4. Cam 35 leaves the upper U-profile and thus Unit 2 is lowered back to the Surface, Legs 39,40 again make contact with the Surface, as shown in FIG. 6.
5. Cam 35, belonging to Unit 1, now makes contact with the lower surface of the U-profile 30, so Unit 1 starts rising relative to Unit 2, lifting legs 6,7 from the surface; Cam 32 starts leaving Block 34, as shown in FIG. 7.
6. Cam 32 completely left Block 34, so it let the springs 14,16 (FIG. 2) close the distance between Units 1,2 as evidenced by the gap between Block 9 and Screw 11 shown closed, As now the legs of Unit 2 are on the surface, Unit 1 essentially moves to the right the same step-distance that Unit 2 made before. As Cam 35 begins leaving the U-profile below it, Unit 1 begins to lower itself back, as shown in FIG. 8.
7. The support assembly is again in the stationary position all four legs 6,7,39,40 on the surface, as shown in FIG. 3.

Box 3 in these drawings and description is, for example, an ink-jet printing head, or any other tool. These tools might be connected to the support assembly in any other place and are not part of this invention.

The operation of the machine consists of combined actions: The support assembly performs stepping movement, each step containing a stable (rest) period when solid contact with the surface is maintained, during which the action of the tool takes place. As the tool operation might create vibrations and/or some reactive forces from the treated surface, such contact is necessary for complete rest of the machine during this period. Preventing any motion ensures both the accuracy of the treating operation and the further propagation of the support assembly. This characteristic, together with the geometrical accuracy of the steps themselves, provides the overall accuracy of operation of the surface treating process.

The printed material is laid on surface 4. Between the surface and the support assembly.

Unstable material can be pressured by the bottom of Unit 1 legs 5,6 and legs 7,8 that can be connected in horizontal position.

Axle 17 performs identical vertical actions by its cams against their neighboring U-profiles.

What is claimed is:

1. An apparatus for treatment of a flat surface, the apparatus comprising a support assembly for supporting a treatment tool, said treatment tool being capable of application to a flat surface, wherein said support assembly is designed to be brought into contact with said flat surface and operable for step-by-step reciprocating movement along said flat surface, wherein said support assembly comprises:

a. A first unit and a second unit that float relative to each other, and are above said flat surface, said first unit or said second unit carrying a treatment tool positioned with appropriate friction on said flat surface to be treated with said treatment tool, wherein said treatment tool is selected from the group comprising a printing tool, a scanner, a pantograph, a cutter, a laser and an engraver;

b. A spring system connected to each unit for holding the units as close to each other as possible;

c. Two parallel axles with cams at each corner of said support assembly, the cams being capable of creating vertical and horizontal motion of said first and second units with respect to each other; and d. An electromechanical mechanism, which is commanded from outside of the apparatus, said electromechanical mechanism providing rotational, synchronized motion to said parallel axles, wherein the movement of the support assembly is a sequence of discrete steps, each one comprised of the following stages: said first unit being raised relative to said second unit, moving a full step forward and lowering-back-to-said flat surface; said second unit being raised relative to said first unit and thereby moving a full step forward and lowering back to said flat surface; and after said discrete steps, treatment is capable of activation when both units are on said flat surface.

2. The apparatus according to claim 1, wherein the spring system is composed of two springs to keep said first and second units longitudinally close and a spring to maintain lateral direction contact.

3. The apparatus according to claim 1, wherein said first and second units are positioned to slide one on the other by tracks such that horizontal movement and vertical movement are created by changing the length of said legs.

4. The apparatus according to claim 3, wherein the legs length can be regulated to handle a surface of non-uniform height.

5. The apparatus according to claim 1, wherein the height of said treatment tool above said flat surface can be regulated.

6. The apparatus according to claim 1, wherein said axles are capable of reversing directions.

7. The apparatus according to claim 1, wherein said treatment tool has another support assembly, thereby permitting a two-axes operation.

8. A method for treatment of a flat surface with the apparatus claimed in claim 1, wherein said treatment tool is mounted onto said support assembly, said method comprising the steps of:

a. Placing said support assembly onto said flat surface and treating said flat surface with said treatment tool; and b. Driving said support assembly for step-by-step reciprocating movement thereof along said flat surface.

9. The apparatus according to claim 1, wherein said support assembly is capable of moving on said flat surface and is of any size with respect to said flat surface.

10. The apparatus according to claim 1, wherein said treatment tool is a printing tool.

* * * * *